(No Model.)
E. B. BARKER.
ROLL HOLDER CAMERA.
No. 518,802. Patented Apr. 24, 1894.
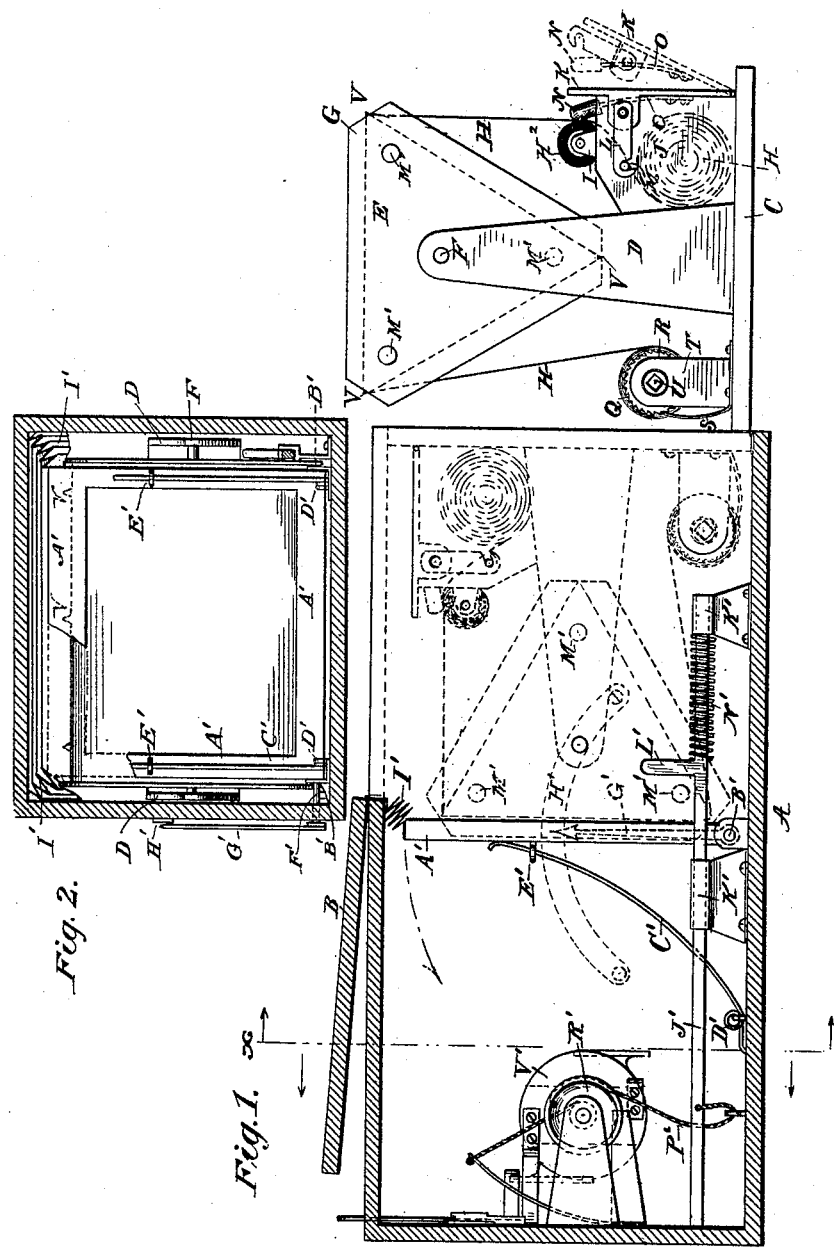
WITNESSES:
Edward C. Rowland
J E Hoffman
INVENTOR
Erastus B Barker
BY Phillips Abbott
his ATTORNEY
THE NATIONAL LITHOGRAPHING COMPANY,
WASHINGTON, D. C.

UNITED STATES PATENT OFFICE.

ERASTUS B. BARKER, OF NEWARK, NEW JERSEY.

ROLL-HOLDER CAMERA.

SPECIFICATION forming part of Letters Patent No. 518,802, dated April 24, 1894.

Application filed December 19, 1891. Serial No. 415,587. (No model.)

*To all whom it may concern:*

Be it known that I, ERASTUS B. BARKER, a citizen of the United States, and a resident of Newark, in the county of Essex and State of New Jersey, have invented certain new and useful Improvements in Photographic Cameras, of which the following is a specification.

My invention relates to improvements in roll holder cameras, it being specially adapted to detective cameras, so-called, although applicable also to cameras generally; and it consists in the construction and arrangement of the parts hereinafter set forth which will be more easily understood by a detail description of them than by a general statement. An important feature, however, of my invention may be stated here, which is, that my camera requires two operations only, one the shifting of the sensitive film to take successive pictures and the other the depression of the button or latch which releases the shutter. All other operations are automatic.

In the drawings, Figure 1, illustrates a longitudinal vertical section of my camera box showing the film holding and manipulating devices in two positions, being tipped backwardly as shown in full lines and forwardly into their normal position within the camera in dotted lines. Fig. 2, is a view taken on the line X, X, of Fig. 1, looking rearwardly showing the oscillating frame partly broken away and the rotary film supporting and measuring frame in rear of it.

A, is the body of the camera. B, is a hinged cover at its upper part.

C, is a hinged rear end. To the inside of the rear end C, are fastened a couple of standards D, preferably made of metal; upon which a three sided frame E, rotates being supported on a shaft F, the sides of this frame are composed of flat surfaces preferably of wood and the two end pieces G, project radially somewhat beyond the side pieces.

H, is a roll of sensitive film placed within a box or casing J.

K, is the rear end of the box, which is hinged so that it may be tipped backwardly for the insertion of another roll of sensitive film whenever desired.

L, is a latch attached to the part K, which catches over a pin M.

N, is a compression or friction pad set on the free end of a spring O, which bears against the roll of sensitive material at all times to prevent its too easy rotation.

$H^2$ is a roller supported on bearings I and it is located about opposite the friction pad N, so as to act as a resistance to it in order that the film which is brought upwardly from the roll H, in the box between the pad and the said roller may be retarded in its delivery by the pinching or frictional action of the pad upon the film. The sensitive film passes from the roll H, within the box or casing up over the rotating frame E and down again to a roller Q, which is provided with a ratchet R and a spring pawl S. It is supported on standards T, there being a shaft U, through the center of the roller, one end of which is squared so that it may be turned by a key which is introduced through a hole made in the side of the camera box. At the corners of the frame E, are prick points V, which puncture the film P, as it travels over them and this frame E, is thus made to rotate as the film is wound up upon the roller Q, and also the prick marks made by the prick points V, indicate the line of division between adjoining pictures.

A' is an open frame pivoted at B' to the bottom of the camera box, and normally pressed rearwardly by two springs C', which are fastened at their lower end as at D' to the bottom of the camera box and which pass through eyes, E' fastened to the frame A' near their upper ends, whereby they are held in position.

F' is a shaft upon which the frame A' oscillates and on the end thereof on the outside of the camera is an index finger G', which co-acts with an index H' on the outside of the camera.

I' is a continuous bellows-like device, which extends up the vertical sides and across the top of the oscillating frame A', and at one of its edges this bellows is fastened to the frame, and at its other edge it is fastened to the sides and top of the camera box so that the passage of light from the front portion of the camera to the rear part where the sensitive film is, is prevented excepting through the open interior space within the frame. This bellows is V shaped at the sides of the oscillating frame A', the point of the V being adjacent to the axis of the frame, resembling gussets employed in pocket-books; but across the top of the frame the bellows is square, and, of course, as is usually the case, the bellows is folded upon itself, so as to be extendible and collapsible.

J' is a rod or bar adapted to slide longitudinally through bearings K', K', fastened to the bottom of the camera box. It is provided with an upwardly extending finger L', which engages with pins M', M', M', on one of the ends of the revolving film supporting frame E, the rod J' is also provided with a spring N', which abuts at one end against the finger L' and at the other end against the rearmost bearing or slideway K'. The forward end of the rod J', as at O' is stopped against the front end of the camera when it is in its most forward position.

P' is a cord or small chain attached to the side of the rod J'. This cord or chain P' passes upwardly over a pulley R' which is fastened to a hub or windlass whereby a shutter V', shown in this instance as being a rotary cylindrical shutter is operated. The shutter is provided with the necessary devices usual in such cases whereby it will be held against the stress of its motor and other devices for releasing the shutter when desired. These devices are some of them, illustrated in the drawings, but are not specifically described, because they form no essential feature of my invention, excepting the cord or chain, P' and pulley R' which are arranged in conjunction with the other parts of the shutter mechanism, as that the pull upon the cord or chain will serve to set the shutter in a manner now well known.

The operation of the apparatus is as follows: The rear of the camera is first tipped outwardly and backwardly as shown in full lines in Fig. 1, then the door K, is unlatched and tipped backwardly, a roll of sensitive film is then put in position in the box or casing J. The end of the film is then drawn outwardly from the roll, the door K is now closed again, so that the friction pad N is brought in contact with the roller H² the film being between them. The end of the film is then passed upwardly and over the rotating frame E, and down to the roller Q to which it is attached in any preferred manner. There are several well known plans now in operation. The key is then applied to the squared end of the shaft of the roller Q shown at U and a turn or two is given to the film whereby it is drawn snugly down upon the oscillating frame E and is punctured at the corners by the prick points, V. The rear of the camera C is now tipped over forwardly into the camera and the top B is closed down and fastened in any suitable manner. The object to be photographed having been found the operator introduces the key into the side of the camera box and turns the oscillating frame E, giving it, when the frame has three sides as here shown, one-third of a complete rotation.

In so doing one of the pins M' on one end of the rotating frame E comes in contact with the finger L' on the sliding bar J' and that bar is forced rearwardly the spring N' being compressed. This movement pulls on the cord P', which owing to its engagement with the pulley R' actuates the devices which set the shutter. During the rotation of the frame E, the oscillating frame A' is pressed over forwardly by the impact of the flanges G on the frame E against the sides of the frame A' and during this operation the springs C' are compressed, and the bellows I' are expanded, and also near the termination of the rotating movement of the frame E, the pin M' upon it which engages with the finger L' moves over the top of that finger so that the spring N' is free to act and the bar J' is immediately carried forward again by it, so that the cord P' is slackened. The shutter V', however, cannot revolve at this time being held by any suitable device, many forms of which are now well known. As the frame E completes its one-third revolution, the oscillating frame A returns to a vertical position and the fact that it has done so and rests squarely against the face of that side of the frame E which is presented squarely to the lens is indicated by the index finger G', on the outside of the camera, and it will be seen that because of the exterior index being actuated by the inclination of the frame A' which is moved by the rotating film supporting frame E, that any angle at which the film may be will be indicated by the index finger. Consequently the operator can at a glance at his index adjust the plane of the film relative to the lens, or in other words, the plane of the side of the frame E, which supports the film exactly as he desires by more or less turning of the key. Now to take a picture; the latch or other device which holds the shutter is touched or released, the shutter is rotated, the plate exposed and the picture taken and the cord P' is again wound up on the pulley or windlass.

I claim—

1. The combination in a camera of means to support a roll of sensitive film and a rotatable film feeding and supporting frame having flat sides, both of said devices being attached to a movable portion of the camera, so that they may be removed from its interior, a roll or shaft, operated by a key from the outside of the camera, a sliding bar connected with the shutter and pins upon the rotatable feeding and supporting frame, which engage with said sliding bar, substantially as set forth.

2. The combination in a camera of means to support a roll of sensitive film, a friction device to retard the movement of the film, a rotatable film supporting frame having flat sides, a roll or bar operated by a key from the outside of the camera, a frame pivoted to the camera, and which extends transversely across it in front of said film supporting frame, adapted to rest against said film supporting frame and be oscillated by it during its revolution, springs which press it against the film supporting frame, a gusseted bellows-like device, connecting the frame and the sides of the camera, and a shutter, substantially as set forth.

3. The combination in a camera of a rotatable film supporting frame having flat sides, a movable frame which extends transversely across the camera, located in front of said film supporting frame, and resting against it, springs which press it against the film supporting frame, means to exclude the light attached to the movable frame and to the sides of the camera adjacent to it, a sliding bar connected with the shutter mechanism at one end, a retractile spring therefor and pins upon the rotatable film supporting frame, which engage said sliding bar during its rotation, and a shutter, substantially as set forth.

4. The combination in a camera of a hinged rear portion of the camera box having mounted upon it supports for a roll of film, a spring actuated friction pad having a roller or bar in front of it, between which the film may pass, also a rotatable film supporting frame having flat sides, a bar or shaft adapted to take up the sensitive film after exposure operated by a key from the exterior of the camera, prick points upon the edges of the rotatable film supporting frame, a frame pivoted to the camera and extending transversely across it, provided with light excluding bellows-like device attached to it and to the camera, a spring which normally presses said frame against the rotatable film supporting frame and a shutter, substantially as set forth.

Signed at New York, in the county of New York and State of New York, this 17th day of December, A. D. 1891.

ERASTUS B. BARKER.

Witnesses:
PHILLIPS ABBOTT,
THOS. A. NOLAN.